G. H. GIBSON.
MEASURING APPARATUS.
APPLICATION FILED FEB. 1, 1911.
1,202,052.
Patented Oct. 24, 1916.
3 SHEETS—SHEET 2.
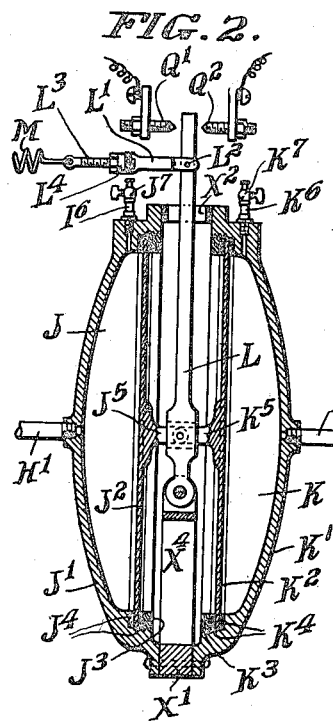
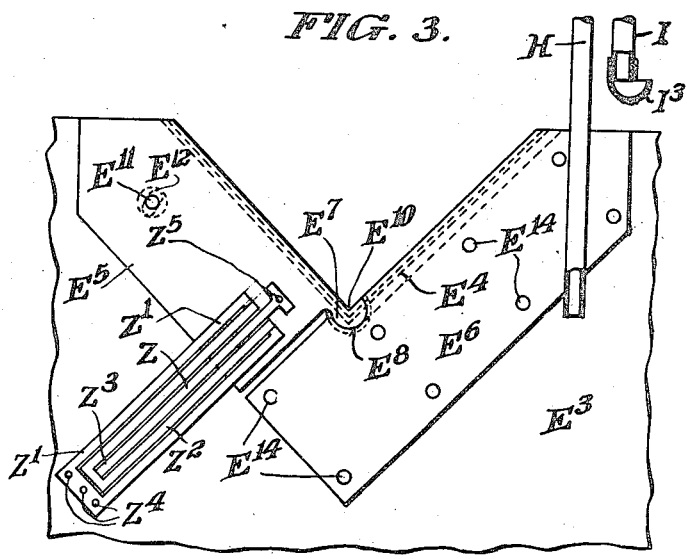
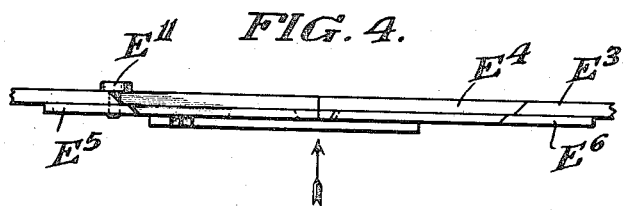
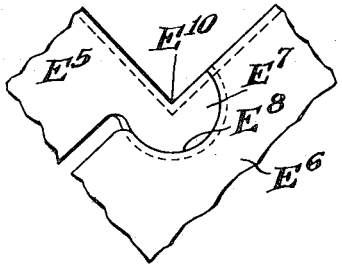
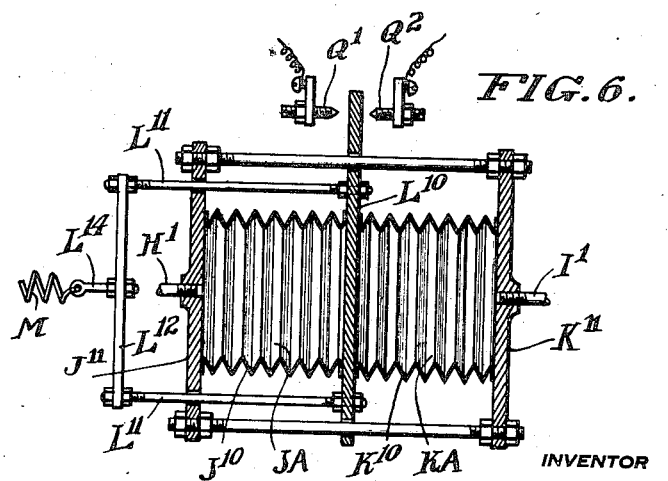

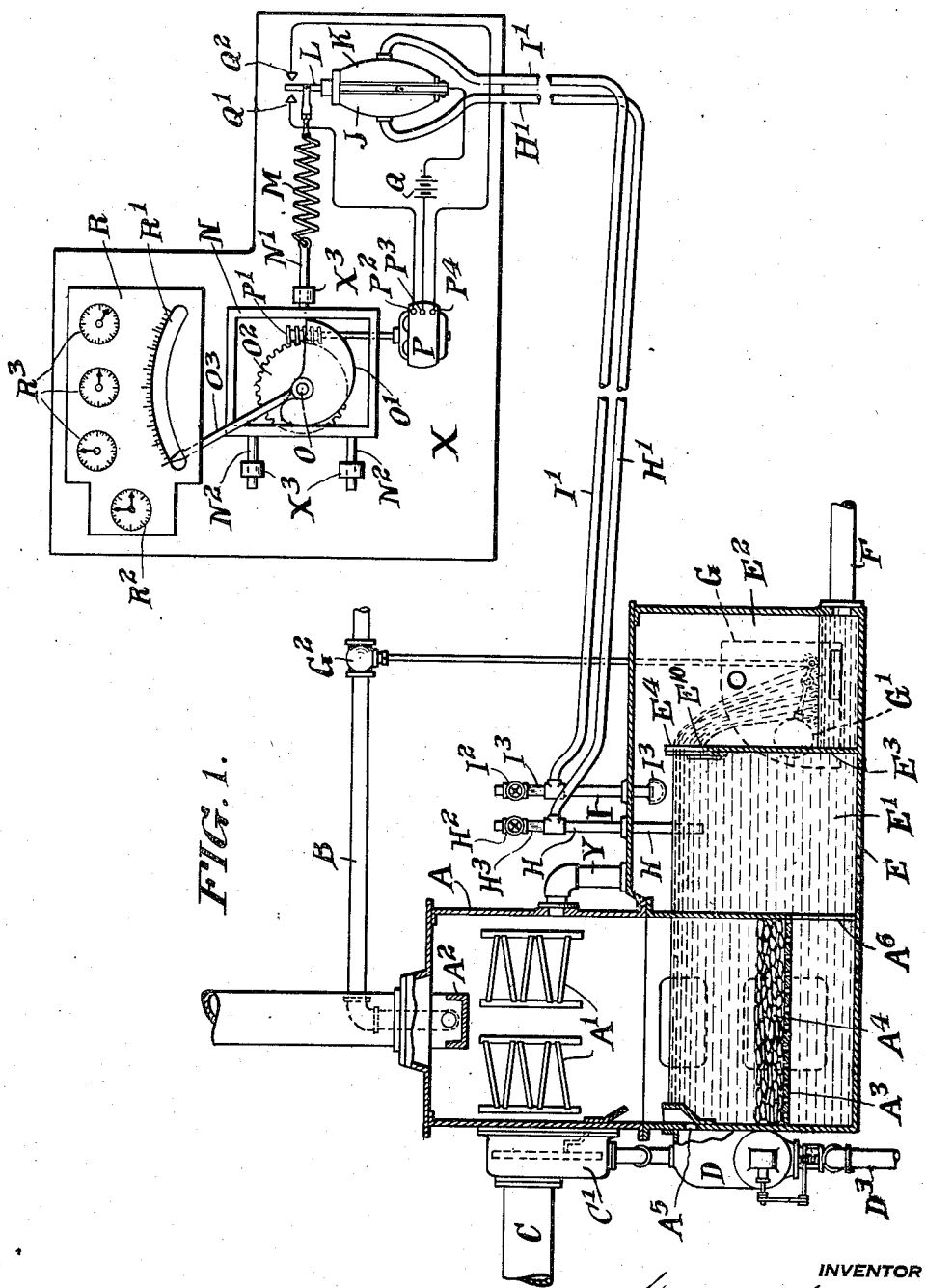

G. H. GIBSON.
MEASURING APPARATUS.
APPLICATION FILED FEB. 1, 1911.
1,202,052.
Patented Oct. 24, 1916.
3 SHEETS—SHEET 3.
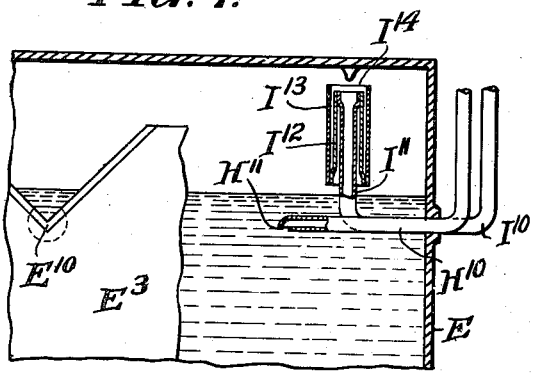
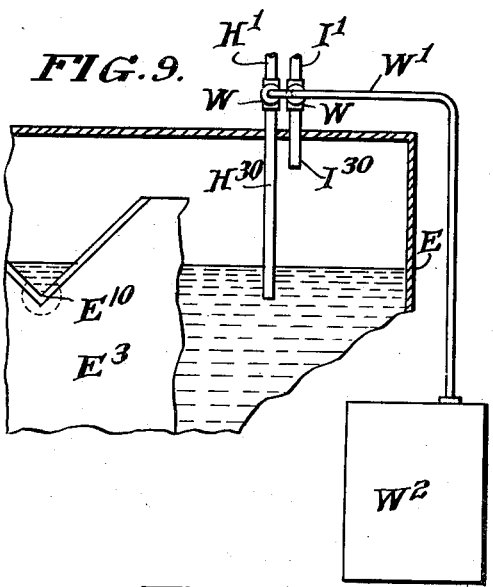
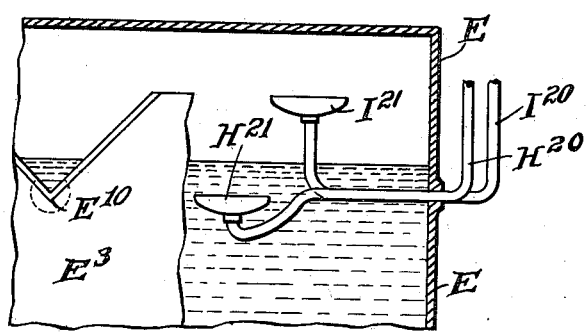
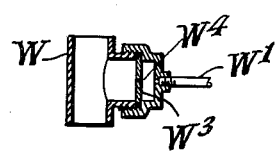
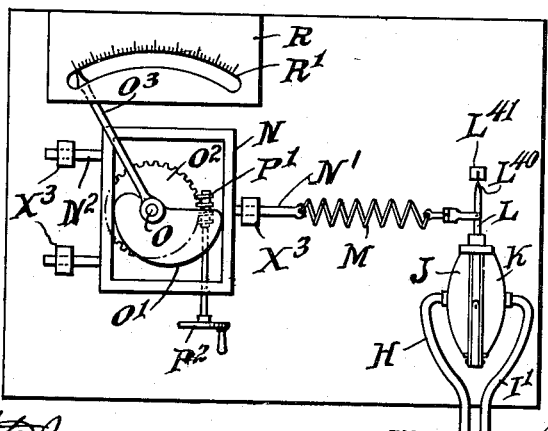
WITNESSES
INVENTOR
George H. Gibson
BY
ATTORNEY

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS.

MEASURING APPARATUS.

1,202,052.   Specification of Letters Patent.   Patented Oct. 24, 1916.

Application filed February 1, 1911. Serial No. 605,878.

*To all whom it may concern:*

Be it known that I, GEORGE H. GIBSON, a citizen of the United States of America, residing in Montclair, in the county of Essex and State of New Jersey, have invented a certain new and useful Improvement in Measuring Apparatus, of which the following is a true and exact description, reference being had to the accompanying drawings, which form a part thereof.

My present invention comprises novel means for determining the rate of flow of a liquid over a weir by means responsive to the variations in hydrostatic pressure occurring on the supply side of the weir and thereby determining the variations in height of the liquid level on that side of the weir, said height varying in accordance with known laws as the rate of flow over the weir changes; and in its more specific aspects the present invention consists in the novel and effective means which I have devised for measuring the rate of flow through a closed weir chamber associated with, and receiving the discharge from an open water heater, as disclosed and claimed in my prior Patent Number 1,015,556, granted January 23rd 1912.

In its broader aspects, however, the invention consists in fluid flow measuring apparatus not limited to use in such apparatus as is claimed in my prior patent to which reference has been made.

In carrying out my invention, I employ a pressure chamber in which the pressure varies as, or in a determined relation with the variations in the fluid pressure which it is desired to measure, and provide said chamber with a movable wall portion, which may be in the form of a flexible diaphragm or the like, and provide means for balancing the outwardly acting force of the fluid within the pressure chamber on the movable wall thereof.

In so far as I have just specified, the pressure responsive apparatus does not differ from that before known but my present invention includes provisions for so adjusting the intensity of the force opposing the action of the internal fluid pressure that the movable wall portion is maintained at all times in substantially the same position regardless of the variations in internal pressure, instead of being allowed to occupy different positions depending upon the intensity of the pressure within the pressure chamber, as has heretofore been the practice with pressure measuring apparatus of this general character. I find that the adjustment of the external opposing force to thereby maintain the movable wall portion of the pressure chamber in the same position as the pressure in it varies, substantially increases the sensitiveness of the apparatus and the accuracy of the results obtained.

In addition to the features above mentioned, my invention embodies various novel features of construction and arrangement hereinafter described and claimed.

For a general understanding of the invention and its advantages, reference should be had to the accompanying drawings and descriptive matter in which I have illustrated and described several forms of apparatus embodying features of my invention.

Of the drawings, Figure 1 is an elevation partly diagrammatic and partly in section of apparatus for measuring the water heated by the direct action of steam in an open water heater. Fig. 2 is a sectional elevation of a portion of the apparatus employed in Fig. 1 taken on a larger scale than that of Fig. 1. Fig. 3 is a partial sectional elevation of a weir construction, which may be employed as, or in lieu of that shown in Fig. 1 and embodies provisions for varying the weir notch angle to compensate for temperature variations in the water flowing over the weir. Fig. 4 is a plan of the apparatus shown in Fig. 3. Fig. 5 is a partial elevation taken similarly to Fig. 3 but on a larger scale. Fig. 6 is a sectional elevation of pressure measuring apparatus differing from that shown in Figs. 1 and 2. Fig. 7 is a partial elevation with parts broken away and in section of a portion of the weir chamber illustrating a modification of a portion of the pressure transmitting system shown in Fig. 1. Fig. 8 is a view taken similarly to Fig. 7 showing a third form of apparatus. Fig. 9 is a view taken similarly to Fig. 7 showing a fourth form of apparatus. Fig. 10 is a sectional elevation of a portion of the apparatus shown in Fig. 7. Fig. 11 is a diagrammatic representation of a modified form of a portion of the apparatus shown in Fig. 1.

Referring first to the apparatus shown in Fig. 1, A represents the body portion or tank of an open feed water heater, which in construction and arrangement may be identical with the common form of this type of heater which has been well known and in common use for many years. In the form illustrated, A' represents the water spreading trays A², the water distribution box and A³ the perforated plate supporting coke or other suitable purifying and filtering material A⁴. A⁵ represents the overflow discharge orifice through which the excess water heated in the heater is discharged. B represents the cold water supply pipe. C represents the pipe supplying steam for heating the water. C' is an oil separator of common form. D represents the overflow box into which the port A⁵ opens and into which the oil and other impurities drain from the separator C'. D³ is a waste pipe leading from the box D and controlled by a valve operated, as is usual, by a float (not shown) in the box D.

In the form shown in the drawings, the measuring box or weir receptacle E is secured to the side of, and forms a part of a unitary structure with the heater tank A. The receptacle E is divided into two compartments E' and E² by the weir E³ which does not extend to the top of the receptacle, and preferably has the notch or orifice E⁴ formed in its upper edge, as best shown in Fig. 3. Y represents a steam pipe connection for equalizing the pressure in the steam space of the tank A and receptacle E. F represents the service discharge connection from the compartment E². The discharge port A⁶ of tank A opens directly into the lower end of the compartment E'. The supply of water to the tank A is controlled in response to the accumulation of water in the compartment E² by means of a valve G² in the water supply pipe B, the valve being opened and closed by a float G' in the float box G. The latter is in communication with the compartment E² and the valve G² is opened and closed as the water level in compartment E² falls below or rises to a predetermined height.

With this apparatus the height of water level in the compartment E' above the level of the apex of the weir notch E⁴, will vary in accordance with a known law with the variations in the rate of flow of water from the compartment E' into the compartment E². The variations in height of the water level in compartment E' may be indirectly measured and the rate of flow determined by means responsive to the variations in hydrostatic pressure in the chamber E' at a determined level below the normal surface of the liquid. To accomplish this with the apparatus of Fig. 1, a vertical pressure tube H is extended into the compartment E' with its open end at the level of the apex E¹⁰. A pipe H' leads from the upper end of the pipe H to the pressure chamber J of the pressure measuring apparatus which may be located at a distance from the weir receptacle E and need not be at the same level therewith. The pressure chamber J may be formed in various ways. As shown in Figs. 1 and 2, it comprises a body portion J' connected to brackets X' and X² extending from a suitable support or base X. The pressure chamber body J' is in the shape of a shallow cup, and the movable wall portion thereof is formed by a flexible disk J², of any suitable material, such as soft copper which is detachably secured at its periphery to the body J' by the externally threaded ring J³, suitable packing rings J⁴ being provided to insure tight joints. The disk J² has formed on it, or secured to it at its center a projection J⁵ which is pivoted to a lever L, pivoted at its lower end on the projection X⁴ of the bracket X'. Various provisions may be made for exerting the varying force upon the lever L necessary to balance the outward thrust upon the lever exerted by the diaphragm J² without permitting any substantial movement of the diaphragm. In Fig. 1, I have illustrated an arrangement for accomplishing this purpose automatically, which includes a tension spring, an electric motor for adjusting the tension of the spring, and electric circuit connections by which the motor is caused to increase or decrease the tension of the spring upon slight movements in one direction or the other of the lever L. As shown in Fig. 2, the lever L extends through the bracket X² which is slotted and to its upper end a yoke L' is pivotally connected at L². A threaded rod L³ forms an extension of the yoke L' which may be adjusted by means of the nut L⁴. A tension spring M connects the rod L³ and thereby the lever L to a tension adjusting member N. The latter is in the form of an apertured plate having guide extensions N' and N² sliding through brackets X³ projecting from the base member X. Within the aperture in the member N, is located a cam O' the particular contour of which is determined by principles hereinafter explained. The cam is carried by a shaft O extending transversely to the plane of movement of the member N and through the member N takes the pull of the spring M. The shaft O has secured to it a gear wheel O² which meshes with and is driven by the worm P' carried by the shaft of the electric motor P. The latter is supplied with current from a suitable source as the battery Q, connected between one terminal P³ of the motor and the lever L, the other motor terminals P² and P⁴ are connected by suitable conductors, one to an adjustable contact Q' at one side of the lever L and the other to the corresponding adjustable contact Q² at the other side of the lever L. The arrangement is such that a very slight movement of the lever L to the left will close a circuit, including the battery Q, lever L, contact Q' and the motor terminals P² and P³, which will cause the motor to revolve in the direction to give the shaft O a counter-clockwise rotation and thereby relieve the tension on the spring M sufficiently to permit the lever L to move out of engagement with the contact Q'. Similarly, a slight movement of the lever L to the right will cause a circuit to be closed, including the battery Q, lever L, contact Q² and motor terminals P³ and P⁴, whereupon the motor will give a clockwise rotation to the shaft O, and thereby increase the tension of the spring M and move the lever L out of engagement with the contact Q².

Where, as in the apparatus shown, the vapor pressure acting on the upper surface of the liquid in the compartment E' is not necessarily the same as the atmospheric pressure acting on the outer side of the diaphragm J², it is essential for accurate results that this should be compensated for, and in the apparatus disclosed, I employ for this purpose a pressure chamber K which may be in all respects similar to the pressure chamber J and comprise parts K', K², K³, K⁴ and K⁵, like the parts J' to J⁵ inclusive respectively. I secure the chamber K to the brackets X' and X² with the projection K⁵ in line with the projection J⁵ and facing the opposite side of the lever L from that faced by the projection J⁵. The interior of the pressure chamber K is connected by a pipe I' and the extension I thereof to the interior of the receptacle E above the water level therein. In the arrangement shown in Fig. 1, I have the tubes H' and I' both filled with a liquid, as water, and subject both tubes, so far as possible, to the same temperature conditions as by arranging them side by side and in close proximity to each other. To avoid inaccuracies, which might be caused by the presence of air or other gases in the pressure chambers J and K and in the pipes leading thereto, I preferably provide means, such as the cocks J⁷ and K⁷ to facilitate the removal of air from the pressure chambers and the conduits and the filling of these chambers and conduits with the desired liquid. These cocks open to the corresponding pressure chambers J and K at their highest points. Where the chambers J and K are located at or above the level of the connections H and I, I preferably depress the pipes H' and I' adjacent the members H and I, so that any air passing into the tubes H and I from receptacle E will tend to accumulate at the upper ends of said members, and small cocks H² and I² may be provided through which the accumulated air may be blown out from time to time, very readily with the apparatus disclosed in which the steam pressure within the chamber E is usually above the atmospheric pressure. The pipe sections H³ and I³, immediately adjacent the cocks H² and I², and the pipe sections J⁶ and K⁶ between the cocks J⁷ and K⁷, and the chambers J and K, may advantageously be made of glass, so that air accumulating therein may be visually detected. To maintain the pipe I full of water, I may provide a water seal at its lower end. This may be obtained by means of the cup-like extension I³, formed at the lower end of the pipe I and constantly supplied with water by condensation of the steam in the steam space of the compartment E'.

The general laws governing the flow of liquid through V-shaped notches have long been known, and in general, it may be said that the volume of flow varies substantially in the same ratio as the five-halves power of the height above the apex of the weir notch of the liquid level on the supply side of the weir. A highly accurate and general formula for the character of weir notch suitable for use in apparatus of the kind disclosed, is the following:

$$V = .316 \tan \frac{\theta}{2} H^{2.473}$$

In the formula just given V is the flow in cubic feet per minute, H is the height in inches of the water level on the supply side of the weir above the apex of the weir notch, and θ is the angle of the weir notch.

For many purposes, as in determining the amount of heated water supplied to boilers, for instance, the weight and not the volume of the liquid flowing is the quantity primarily wanted, and with the present apparatus, the operation depends upon the relation between the liquid pressure on the supply side of the weir at the level of the weir apex and the amount of the liquid flowing. The relation between H, the height in inches of a column of liquid, P the hydrostatic pressure at the bottom of the column in pounds per square inch and D the weight of a cubic inch of the liquid, is expressed by the formula:

$$H = \frac{P}{D}$$

From this formula and the first given formula $$(V = .316 \tan \frac{\theta}{2} H^{2.473})$$

the following formula may be obtained by simple substitution:

$$W = \frac{546.048 \tan \frac{\theta}{2} P^{2.473}}{D^{1.473}}$$

In the last given formula W, (equal to 1728 V D) is the number of pounds of liquid flowing per minute.

If the conditions be such that in the formula just given, W and P are the only variables, it is apparent that by giving the cam O' the proper contour, and those skilled in the art will understand how this may easily be done, the angular movements of the shaft O may be proportional to the changes in the quantity W, while at the same time, the changes in the tension of the spring M, resulting from such movements, are proportional to the corresponding changes in P, so that the angular position of the cam O' and of the shaft O, at any instant, will correspond directly to the number of pounds of water then flowing per minute. Those skilled in the art will understand that the shaft O may be made to operate in known ways suitable means for indicating, recording or registering the quantity of water flowing through the weir notch as may be desired.

In the apparatus shown in Fig. 1, I have shown an arm $O^3$ attached to the shaft O which enters the box of a registering mechanism R and serves as a pointer playing along the graduated scale R' to indicate the amount of water flowing per minute at any instant, and also as a means for adjusting the connection between the counting wheels actuating the hands coöperating with the disk $R^3$ of the registering mechanism, and the clock mechanism $R^2$ which drives the counting train. I have not thought it necessary to illustrate the means by which the arm $O^3$ adjusts the gearing connecting the clock mechanism with the counting wheels proper for the reason that it forms no part of my invention and for the further reason that quantity exhibiting arrangements for this general purpose have long been known. One form of mechanism for this purpose, which I refer to merely by way of example is shown in Patent No. 84,476 granted to Chameroy, December 1, 1868.

The weight of a unit volume of liquid, such as water, is, in general, different at different temperatures. In order, therefore, that a given pressure at the bottom of the pressure tube H may always correspond to a given rate of flow in pounds per minute, it is essential to compensate or correct for the change in density of the liquid flowing produced by changes in temperature. One way of accomplishing this is so to change the angle of the weir as the temperature of the water changes, that the quantity $$\frac{\tan \frac{\theta}{2}}{D^{1.473}}$$

remains constant. Results sufficiently correct for all ordinary practical purposes may be obtained with the type of apparatus disclosed by employing provisions, including a simple thermostatic arrangement for increasing and decreasing the weir angle as the temperature of the water decreases and increases.

In the particular form of apparatus shown in Figs. 4 and 5 for adjusting the weir notch angle as the temperature of the water varies, the weir notch proper is formed by two weir edge strips $E^5$ and $E^6$ of suitable material, such as brass, which are mounted on, and overlap the margin of the notch $E^4$ formed in the weir $E^3$ proper. The plate $E^6$ is secured directly to the weir $E^3$ proper, as by rivets $E^{14}$ and the strip $E^6$ is formed with an undercut socket $E^9$ concentric with the apex $E^{10}$ of the weir notch, and in this socket is received the chamfered circular extension $E^7$ of the weir edge strip $E^5$. The latter fits snugly against the weir $E^3$, the adjacent surfaces being carefully machined to restrict leakage and in addition to being held in place by the pressure of the water on it, one or more rivets $E^{14}$, (one being shown) may be secured to the strip $E^5$. The rivet $E^{11}$, shown, passes through a slot $E^{12}$ in the weir $E^3$ and has an enlarged head which bears against the discharge side of the weir $E^3$. To automatically turn the weir edge strip $E^5$ about the apex $E^{10}$ any suitable thermostatic mechanism may be employed. In the conventional form illustrated the thermostatic mechanism Z comprises a U-shaped member Z' anchored at its bottom as by rivets $Z^4$ to the weir $E^3$. To the ends of the legs of the member Z' are secured the ends of the legs of a U-shaped member $Z^2$, and to the bottom of the latter is secured one end of a rod $Z^3$. The upper end of the rod $Z^3$ is secured to the weir edge strip $E^5$ as by the rivet $Z^5$.

The U-shaped member $Z^2$ is formed of some material, such as iron, having a relatively small coefficient of expansion, and the members Z' and $Z^3$ are formed of material such as zinc, having a relatively large coefficient of expansion. In consequence the edge strip $E^5$ is turned about the apex $E^{10}$ toward and away from the strip $E^6$ as the temperature of the water rises and falls, and by properly proportioning the parts, the angle of the weir may thus be varied to the extent necessary to obtain a close approximation to the theoretical change in flow required to insure a rate of flow with a given hydrostatic pressure at the mouth of the tube H which does not vary with the temperature of the water.

It is of course apparent that with the weir adjusting apparatus disclosed, the angle of the portion of the notch formed wholly in the strip $E^5$ is not varied by moving that strip, but as this portion of the notch is small, and since in general, only a small fraction of the total flow takes place through it, the fact that this portion of the weir notch is not varied as the rest of the weir notch does not appreciably affect the accuracy of the results obtained with the apparatus. I make no claim herein, however, to means for adjusting a weir to compensate for variations in temperature and density of liquid flowing over the weir, except in connection with the particular form of measuring apparatus disclosed herein, for while I believe myself to have been the first to provide means for making adjustments to compensate for the variations in the temperature of the liquid flowing through them, such arrangements, in their general aspects form the subject matter of my Patent No. 1,048,677, granted December 31, 1912, on a co-pending application, filed of even date herewith.

It will be understood, of course, that the invention disclosed herein in its general aspects is not dependent upon the particular form of, or arrangement of pressure chambers employed, and in Fig. 6, I have illustrated an arrangement in which the pressure chambers JA and KA, adapted to be employed in the same way as the pressure chambers J and K respectively, above described, are formed by expansible bellows $J^{10}$ and $K^{10}$ respectively which are placed end to end and connected by an interposed rigid but movable diaphragm or common head $L^{10}$. At their opposite ends the bellows $J^{10}$ and $K^{10}$ are connected to rigid stationary diaphragms or heads $J^{11}$ and $K^{11}$. The diaphragm $L^{10}$ is extended and has connected to it by the rods $L^{11}$ a crosshead $L^{12}$ to which is adjustably connected a member $L^{14}$. To the member $L^{14}$ is secured one end of a tension spring which may be similar to the spring M of the first described construction, and may be connected to similar tension adjusting means. In this form of the invention, the contacts $Q'$ and $Q^2$ may be arranged on opposite sides of an extending portion of the diaphragm $L^{10}$.

While, for most purposes I prefer to employ suitable automatic provisions for adjusting the force necessary to balance the force of the fluid pressure in the pressure measuring apparatus, it is sometimes advantageous, as from the standpoint of simplicity, to manually adjust the balancing force. One arrangement for accomplishing this is shown in Fig. 11, this arrangement differing from that of Fig. 1 primarily in the substitution of a hand wheel $P^2$ for the motor P, which with its circuit connections is done away with. The lever L in Fig. 11 has a pointer extension $L^{40}$ which registers with the line $L^{41}$ when the lever is in the neutral position.

With the apparatus shown in Fig. 1, it will be apparent that the changes in density of the water filling the pressure chambers J and K, conduits H' and I', tube I, and the portion of the tube H above the level of the water in the cup $I^3$ will not affect the results obtained by the measuring apparatus, it being assumed that the temperature conditions in each pressure chamber and all parts of the various conduit connections thereto, are the same as for the other pressure chamber and the corresponding conduit connections to it. The change in density, consequent upon changes in temperature of the column of water in the tube H below the level of the water in the cup $I^3$ may, however, result in slight errors in the readings of the apparatus. This may be avoided in various ways. One arrangement by which such error is avoided is shown in Fig. 7, where the tubes $H^{10}$ and $I^{10}$ corresponding to the tubes H and I of the construction shown in Fig. 1 and adapted to form a part of a pressure measuring system identical with that shown in Fig. 1 except as to the arrangement of the pressure tubes proper, are brought into the weir chamber horizontally at the same level, and with the pipe $H^{10}$ opening at its underside, as indicated at $H^{11}$, at the level of the weir notch apex. The tube $I^{10}$ is formed with an upstanding extension formed by concentric tubes $I^{11}$, $I^{12}$ and $I^{13}$, of materials having different coefficients of thermal expansion, so chosen that the distance between the upper end of mouth $I^{14}$ of the vertical extension of tube $I^{10}$ and the level of the orifice $H^{11}$ varies inversely with the density of the water filling it as the latter varies in temperature. This results in securing a hydrostatic pressure with the tube $I^{10}$ at the level of the orifice $H^{11}$, which is constant and independent of the temperature of the water.

Instead of having the conduits running from the pressure chambers to the weir chamber, open to the latter, as in Figs. 1 and 7, these conduits may be sealed and the pressure transmitted through flexible diaphragms. One arrangement of this character is illustrated in Fig. 8 wherein the tubes $H^{20}$ and $I^{20}$, corresponding to the tubes H and I of Fig. 1 have connected to their ends within the weir chamber pressure chambers $H^{21}$ and $I^{21}$, which may be like the pressure chambers J and K. The pressure chamber $H^{21}$ has its flexible diaphragm horizontal and at the level of the weir notch apex, while the diaphragm of the pressure chamber $I^{21}$ is above the water level. This arrangement avoids the errors which result from the accumulation of air in pipes normally filled with liquid, and the tubes $H^{20}$ and $I^{20}$ may be connected directly to the pressure transmitting pipes H' and I' of such a system as is shown in Fig. 1. The fluid within the pressure chambers $H^{21}$ and $I^{21}$ and the spaces connected thereto, may be air or other suitable gas, or water, oil, or other suitable liquid. This arrangement has an advantage over that of Fig. 1 also in that the fluid employed in the pressure chambers and connected pipes may be of such character that there is no possibility of liquid freezing in any portion of the pressure transmitting system.

In the form of apparatus shown in Figs. 9 and 10 the tubes H³⁰ and I³⁰, corresponding to the tubes H and I of Fig. 1, may enter the weir chamber, as in Fig. 1, and may be open at their inner ends to the interior of said chamber. In this form, however, no water seal is provided at the lower end of the tube I³⁰ and the entire pressure transmitting system instead of being filled with water is filled entirely with air. To maintain the pressure transmitting system full of air I provide means for injecting air into the system continuously but slowly with the result that the air constantly escapes in minute quantities from the tubes H³⁰ and I³⁰ at their open ends into the weir chamber, and in consequence, the air pressures within the tubes H³⁰ and I³⁰ respectively, correspond exactly to the hydrostatic pressure at the lower end of the tube H³⁰ and to the vapor pressure above the water level in the weir chamber. To continuously provide air in minute streams to the interiors of the tubes H³⁰ and I³⁰ in the particular form of apparatus illustrated, I connect these tubes to the pressure transmitting pipes H' and I' by fittings W. Each fitting W contains a diaphragm W³, or the like, formed with a fine passage W⁴ through which air under pressure, supplied by a pipe W' from a suitable air reservoir W², compressor, or the like, may slowly leak. This type of apparatus has a number of advantages. With it no errors result from small leaks, into or out of any portion of the pressure transmitting system. There is no possibility, of course, of trouble through freezing of the pressure transmitting fluid. The differences in pressure in the pressure chambers of the pressure measuring apparatus, due to variations in temperature conditions of the air in any portion of the pressure measuring system, are of course, much smaller than where the fluid in the pipes is a liquid. In general, however, I prefer to have the pipes H' and I' in this form of the invention, arranged side by side and in close proximity so as to be subjected to the same temperature conditions, at least as to the vertical portions thereof.

While in acordance with the provisions of the statute I have illustrated the best forms of my invention now known to me, it will be apparent to those skilled in the art that many changes may be made in the form of the apparatus disclosed without departing from the spirit of my invention, and that in some cases, some of the features of my invention may be used with advantage without a corresponding use of other features.

Having now described my invention, what I claim as new and desire to secure by Letters Patent, is:

1. Apparatus for measuring the flow of a liquid comprising in combination a closed weir chamber, a weir located therein, a movable member and means for acting on said member in one direction with a force proportional to the fluid pressure at a fixed level in said chamber on and below the normal liquid level on the supply side of the weir therein, means for exerting a force upon said movable member in the opposite direction proportional to the pressure in said chamber above the liquid level therein and flow exhibiting means responsive to the difference between the said forces exerted on said movable member.

2. Apparatus for measuring the rate of flow of a liquid, comprising a weir chamber, a weir contained therein, a pipe leading from the weir chamber on the supply side of the weir at a determined level below the normal liquid surface level on that side of the weir, a second pipe leading from said weir chamber above the normal liquid surface level therein, a pair of pressure chambers connected, one to one of said pipes and the other to the other of said pipes and each having a movable wall portion and provisions whereby the outward thrust of the internal pressure on the movable wall portion of each chamber opposes the corresponding thrust on the movable wall portion of the other chamber, and flow exhibiting means responsive to the difference between said thrusts.

3. Apparatus for measuring the rate of flow of a liquid, comprising a weir chamber, a weir contained therein, a pipe leading from the weir chamber on the supply side of the weir at a determined level below the normal liquid surface level on that side of the weir, a second pipe leading from said weir chamber above the normal liquid surface level therein, a pair of pressure chambers connected, one to one of said pipes, and the other to the other of said pipes, and each having a movable wall portion and provisions whereby the outward thrust of the internal pressure on the movable wall portion of each chamber opposes the corresponding thrust on the movable wall portion of the other chamber, and flow exhibiting means responsive to the difference between said thrusts, said pipes being so disposed that corresponding portions of the two pipes are subjected to substantially the same temperature conditions.

4. Apparatus for measuring the rate of flow of a liquid, comprising in combination, a weir over which the liquid flows, and flow exhibiting means responsive to the liquid pressure at a determined level on and below the normal liquid surface level on the supply side of said weir.

5. Apparatus for measuring the rate of flow of a liquid, comprising in combination, a weir chamber, a weir over which the liquid flows contained therein, and flow exhibiting means responsive to the liquid pressure at a determined level on, and below the normal liquid surface level on the supply side of said weir, said means including rectifying provisions and a member moved thereby proportionally to the changes in the rate of liquid flow occurring on variations in the pressure measured.

6. Apparatus for measuring the rate of flow of a liquid, comprising in combination an adjustable weir, over which the liquid flows and means for measuring the hydrostatic pressure at a determined level below the normal liquid surface level on the supply side of said weir, and thermostatic means for adjusting said weir to decrease the flow over the weir for a given height of liquid level on the supply side thereof, as the temperature of the liquid flowing increases.

7. Apparatus for measuring the rate of flow of a liquid, comprising in combination a weir having means whereby the notch may be adjusted, over which the liquid flows and means for measuring the hydrostatic pressure at a determined level below the normal liquid surface level on the supply side of said weir, and means for adjusting the weir to decrease the flow occurring with a given height of liquid level on the supply side thereof as the temperature of the liquid flowing increases.

8. Apparatus for measuring the rate of flow of a liquid, comprising in combination a weir, formed with a V-notch through which the liquid flows, and having the sides of said notch relatively adjustable, thermostatic means for causing said sides to approach and recede from each other as the temperature of the liquid flowing rises and falls, and means for measuring the hydrostatic pressure at a determined level on, and below the normal liquid surface level, on the supply side of said weir.

9. Apparatus for measuring the rate of flow of a liquid of varying temperature including in combination a closed weir chamber and a weir contained therein, pressure measuring apparatus comprising a pressure tube opening downward into said weir chamber at a determined level on, and below the normal liquid surface level on, the supply side of said weir, means for slowly injecting a gaseous fluid into said tube at a rate sufficient to insure a relatively slow discharge through the tube into said chamber and flow exhibiting means responsive to the gaseous pressure thus maintained in said tube.

10. Apparatus for measuring the rate of flow of a liquid comprising a closed weir chamber and a weir contained therein, a tube opening downward into the chamber on the supply side of the weir at a determined level below the normal liquid surface level on the supply side of the weir, a second tube opening into said chamber above the normal surface level of the liquid therein, means for slowly injecting air into each tube whereby the air pressure within the said tubes at the points where they open to said chamber correspond in the one case to the hydrostatic pressure at said determined level and in the other case to the vapor pressure above the liquid, and flow exhibiting means responsive to the difference between the air pressures in said tubes.

11. Apparatus for measuring the flow of a liquid, comprising in combination a weir over which the liquid flows, a pressure chamber having a movable wall, provisions for maintaining a pressure within said chamber proportional to the pressure at a determined level below the normal liquid surface level on the supply side of the weir, means for exerting a force on said movable wall to oppose and balance the outward thrust thereon of the pressure within the chamber, said means comprising a spring, and a movable cam for adjusting the tension of the spring, said cam having such a contour that the changes in spring tension, and the movements of the cam producing them, are proportional respectively to the corresponding changes in hydrostatic pressure, and to the changes in the rate of flow of the liquid over the weir.

12. Apparatus for measuring the flow of a liquid, comprising in combination a weir over which the liquid flows, a pressure chamber having a movable wall, provisions for maintaining a pressure therein proportional to the pressure at a determined level below the normal liquid surface level on the supply side of the weir, means for exerting a force on said movable wall opposing the outward thrust thereon of the pressure within the chamber, including provisions for adjusting said force to maintain said wall in a substantially fixed position, and for indicating the amount of said force, comprising a movable cam and a coöperative movable member said cam having such a contour that its movements and the corresponding movements of said member are proportional, one to the changes in the rate of flow of the liquid over the weir, and the other to the corresponding changes in pressure in said chamber.

13. Apparatus for measuring the flow of a liquid comprising in combination a weir over which the liquid flows a pressure chamber having a movable wall, provisions for maintaining a pressure within said chamber proportional to the pressure at a determined level below the normal liquid surface level on the supply side of the weir, means for exerting a force on said movable wall opposing the outward thrust of the pressure within the chamber, including provisions for adjusting said force to maintain said wall in a substantially fixed position, said means and provisions comprising a spring, a shaft, a cam carried by the latter and connections between said cam and said spring whereby the rotation of the shaft varies the tension of the spring, said cam having such a contour that the rotation of the shaft and the resultant changes in spring tension are proportional respectively, to the changes in the rate of flow of the liquid over the weir, and to the corresponding changes in pressure in said chamber.

GEO. H. GIBSON.

Witnesses:
FRANK S. BROADHURST,
WILBERT SAILER.